United States Patent
Castelli et al.

(10) Patent No.: US 6,287,638 B1
(45) Date of Patent: Sep. 11, 2001

(54) FORMATION OF COMPRESSIBLE PLY CONTAINING HIGH MELTING POINT THERMOPLASTIC MICROSPHERES AND PRINTING BLANKETS COMPRISING SAME

(75) Inventors: Francesco Castelli; Gianpiero Invernizzi, both of Lodi (IT)

(73) Assignee: Reeves Brothers, Inc., Norwalk, CT (US)

(*) Notice: Subject to any disclaimer, the term of this patent is extended or adjusted under 35 U.S.C. 154(b) by 0 days.

(21) Appl. No.: 09/447,652

(22) Filed: Nov. 23, 1999

Related U.S. Application Data

(63) Continuation of application No. 07/857,216, filed on Mar. 25, 1992, now Pat. No. 6,071,567.

(51) Int. Cl.⁷ ........................................ B05D 3/02
(52) U.S. Cl. ............. 427/381; 427/389.9; 427/394; 427/407.1; 427/412; 156/280; 156/322; 264/257; 264/258; 264/DIG. 6; 428/909
(58) Field of Search .................. 427/407.1, 412, 427/381, 389.9, 394; 156/280, 322; 264/257, 258, DIG. 6; 428/909

(56) References Cited

U.S. PATENT DOCUMENTS

| | | | |
|---|---|---|---|
| 3,033,709 | 5/1962 | Brown | 117/161 |
| 3,147,698 | 9/1964 | Ross | 101/149.2 |
| 3,219,600 | 11/1965 | Rucker | 260/2.5 |
| 3,418,864 | 12/1968 | Ross | 74/232 |

(List continued on next page.)

FOREIGN PATENT DOCUMENTS

| | | |
|---|---|---|
| 74/49304 | 5/1974 | (AU). |
| 1165046 | 3/1964 | (DE). |
| 2710916 | * 9/1978 | (DE). |
| 2061062 | 6/1971 | (FR). |
| 1099676 | 1/1968 | (GB). |
| 1307230 | 2/1973 | (GB). |
| 1327758 | 8/1973 | (GB). |
| 1354892 | 5/1974 | (GB). |
| 1400932 | 7/1975 | (GB). |
| 1567892 | * 5/1980 | (GB). |

OTHER PUBLICATIONS

Chamberlain, N. G., New Developments in Offset Blankets, *Professional Printer*, vol. 22, No. 6 (1979).

*Primary Examiner*—Erma Cameron
(74) *Attorney, Agent, or Firm*—Pennie & Edmonds LLP

(57) ABSTRACT

A laminated printing blanket having compressible and resilient properties and a method for its production are provided. The compressible characteristics are provided by disposing an intermediate layer having substantially uniformly distributed voids of substantially uniform size between the base ply and the working surface of the printing blanket. The voids of the compressible intermediate layer are formed by introducing high melting point microspheres formed from thermoplastic resins into an elastomeric matrix, coating said microsphere containing elastomeric matrix upon an upper surface of the base ply and then vulcanizing the coated base ply at a temperature of between about 80–150° C. for between about one and six hours to form the compressible layer having substantially uniform compression characteristics. Once all of the layers of the blanket are stacked, a final vulcanization treatment at between about 132–160° C. for between about 30 minutes to sixteen hours at a pressure between about atmospheric and 6 kg/cm² in a known manner completes the curing of all the layers to produce a laminated printing blanket.

20 Claims, 1 Drawing Sheet

U.S. PATENT DOCUMENTS

| | | | |
|---|---|---|---|
| 3,479,811 | 11/1969 | Walters | 37/153 |
| 3,486,968 | 12/1969 | Mater | 161/190 |
| 3,616,145 | 10/1971 | Clifton | 161/87 |
| 3,673,023 | 6/1972 | Ross | 156/137 |
| 3,700,541 | 10/1972 | Shrimpton et al. | 161/160 |
| 3,795,568 | 3/1974 | Rhodarmer et al. | 161/87 |
| 3,983,287 | 9/1976 | Goossen et al. | 428/241 |
| 4,015,046 | 3/1977 | Pinkston et al. | 428/422 |
| 4,025,685 | 5/1977 | Haren et al. | 428/304 |
| 4,042,743 | 8/1977 | Larson et al. | 428/306 |
| 4,086,386 | 4/1978 | Gaworowski et al. | 428/307 |
| 4,093,487 | 6/1978 | Gaworowski et al. | 166/244.16 |
| 4,093,764 | 6/1978 | Duckett et al. | 428/113 |
| 4,303,721 | 12/1981 | Rodriguez | 428/213 |
| 4,422,895 | 12/1983 | Shimura et al. | 156/633 |
| 4,471,011 | 9/1984 | Sporing | 428/68 |
| 4,548,858 | 10/1985 | Meadows | 428/224 |
| 4,751,127 | 6/1988 | Pinkston et al. | 428/141 |
| 4,770,928 | 9/1988 | Gaworowski et al. | 428/284 |
| 4,812,357 | 3/1989 | O'Rell et al. | 428/246 |
| 4,981,750 | 1/1991 | Murphy et al. | 428/220 |
| 5,001,208 | 3/1991 | Ross et al. | 528/61 |
| 5,006,400 | 4/1991 | Pinkston et al. | 428/229 |
| 5,013,811 | 5/1991 | Ross | 528/60 |

* cited by examiner

US 6,287,638 B1

FORMATION OF COMPRESSIBLE PLY CONTAINING HIGH MELTING POINT THERMOPLASTIC MICROSPHERES AND PRINTING BLANKETS COMPRISING SAME

This is a continuation of application Ser. No. 07/857,216, filed Mar. 25, 1992 now U.S. Pat. No. 6,071,567.

FIELD OF THE INVENTION

This invention relates generally to compressible printing blankets, and in particular relates to a compressible ply containing high melting thermoplastic microspheres for use in forming such blankets.

BACKGROUND OF THE INVENTION

The use of blankets in printing techniques such as, for example, offset lithography, is well known, wherein such blankets have a primary function of transferring ink from a printing plate to paper. Such printing blankets are very carefully designed so that the surface of the blanket is not damaged, either by mechanical contact of the blanket with the press or by chemical reaction with the ink ingredients or other solvents used in the printing process. Repeated mechanical contacts do cause a certain amount of compression of the blanket, however, which must be maintained within acceptable limits so that the image is properly reproduced. It is also important that the blanket have resiliency, i.e., that it be capable of eventually returning to its original thickness, and that it provide image transfer of a constant quality regardless of the amount of use to which the blanket is put.

Printing blankets typically comprise, on their lower surface, a substrate or base material which provides integrity to the blanket. Woven fabrics are preferred for forming this base. The base may consist of one or more layers or plys of fabric (the terms "layer" and "ply" are used interchangeably herein). The printing, or "working" surface at the top of the blanket, i.e., the surface that actually contacts the ink, is usually a layer of an elastomeric material such as rubber. As used herein, the terms "upper" or "top" relate to that portion of an individual ply, or of the blanket itself, furtherest removed from the cylinder of the printing press when the blanket is installed thereon. Alternately, "lower" or "bottom" is used to refer to those portions of either an individual ply or the blanket which would be most closely adjacent the cylinder upon installation of the blanket.

The printing surface is conventionally made by calendering or spreading rubber in layers upon the base ply until a desired thickness of the material has been deposited, after which the assembly is cured, i.e., vulcanized, to provide the finished blanket. Such blankets are acceptable for many applications, but they often lack the necessary compressibility and resiliency needed for other applications. It is desirable, therefore, to produce more highly compressible blankets with improved resiliency.

It is difficult, however, to obtain such improved compressibility using the standard construction described above because the rubber material, while highly elastomeric, is not compressible; that is, it cannot be compressed in a direction at right angles to its surface without causing a distortion or stretch of the blanket in areas adjacent to the point of compression. If irregularities exist in the printing plate, the press, or the paper, the compression to which the blanket is exposed will vary during operation of the press and the irregularities will be magnified by the lack of compression in the printing blanket.

Therefore, a key to obtaining a printing blanket having the desired compressibility and resiliency is in providing a compressible layer therein. In particular, it is generally known that by including at least one layer of material comprising a compressible layer of resilient polymer in a printing blanket, that printing problems such as those described above, as well as "blurring" (i.e., a lack of definition), caused by a small standing wave in the blanket printing surface adjacent to the nip of the printing press, can be avoided. Such compressible layer also can serve to absorb a "smash", that is, a substantial deformation in the blanket caused by a temporary increase in the thickness in the material to be printed due to, for example, the accidental introduction of more than one sheet of paper during the printing operation. By incorporating a compressible layer in the blanket, a "smash" can be absorbed without permanent damage to the blanket or impairment of the printing quality of the blanket. In addition, a resilient, compressible layer helps to maintain the evenness of the printing surface and the thickness of the blanket during the printing operation by restoring the normal thickness of the blanket after compression at the nip of the press.

Many different ways of producing a compressible layer within a printing blanket are known in the art. For example, compressible layers have been formed by mixing granular salt particles with the polymer used to produce the layer, and thereafter leaching the salt from the polymer to create voids therein. Such a method is disclosed in Haren et al. U.S. Pat. No. 4,025,685. The voids in the underlying compressible layer thus permit positive displacement of the surface layer without causing distortion thereof since volume compression occurs and displacement takes place substantially perpendicularly to the impact of the press.

Other methods, such as the use of compressible fiber structures, have also been tried heretofore to produce compressible layers. Examples are found in Duckett et al. U.S. Pat. Nos. 3,887,750 and 4,093,764. Rodriguez, U.S. Pat. No. 4,303,721 teaches a compressible blanket made using blowing agents to create voids in the compressible 30 layer. A further method, involving the use of rubber particles to create voids, is disclosed in Rhodarmer U.S. Pat. No. 3,795,568.

Forming voids with the use of blowing agents has the disadvantages, however, that the size of the voids to be formed, and the interconnection of such voids, is not easily controlled. Oversized voids and interconnected voids cause some areas of the printing blanket to be more compressible and less resilient than adjacent areas, which results in the occurrence of deformations during printing. Moreover, the salt leaching technique described above also has disadvantages in that the particle sizes used are limited, and the process is difficult, time consuming and expensive.

More recently, it has been found preferable to produce printing blankets having a compressible layer comprising a cellular resilient polymer having cells or voids in the compressible layer formed with the use of discrete microspheres. It has been found particularly advantageous to produce a compressible layer by incorporating hollow thermoplastic microspheres in the polymer, as illustrated by Larson U.S. Pat. No. 4,042,743. These microspheres are resilient and thus impart good compressibility properties to the layer.

However, in prior art methods of producing a compressible layer employing thermoplastic microspheres for a printing blanket, it has been found that the thickness of the compressible layer to be formed is not easily controlled since typical thermoplastic microspheres will melt at normal processing and vulcanizing temperatures. Since the microspheres melt before the vulcanization is complete, and before the compressible layer achieves a set structure, agglomeration of the voids created by the microspheres occurs, and size variations in the voids also occur. This can affect the overall performance properties of the blanket. Also, the variations in the sizes of the voids can weaken the printing blanket, causing it to wear out prematurely.

Gaworowski et al. U.S. Pat. No. 4,770,928 attempted to solve these problems by incorporating into the elastomeric compounds utilized to form a matrix for the microspheres within the compressible layer, an accelerator capable of permitting vulcanization of the elastomeric compound at a temperature below the melting point of the microspheres. The use of such relatively low temperatures during the vulcanization process, however, results in the need for additional periods of vulcanization with a concurrent increase in the cost, i.e., including that of the accelerator, and complexity of blanket manufacture.

Shrimpton et al. U.S. Pat. No. 3,700,541 and its corresponding British patent No. 1,327,758 disclose that microspheres made of high temperature thermosetting plastics allow the layer to be cured using conventional high temperature vulcanization processes. However, these microspheres are less resilient than thermoplastic microspheres, so that compressibility properties of the layer are compromised.

SUMMARY OF THE INVENTION

An improved compressible layer utilizing high melting point thermoplastic microspheres (also referred to herein as "high temperature thermoplastic microspheres", i.e., those having a melting point higher than the curing temperature of the final compressible layer or printing blanket, has now been developed for use in forming improved compressible printing blankets, which blankets have been found to overcome the deficiencies of the prior art described above.

The present invention provides a process for forming a compressible layer utilizing high melting point thermoplastic microspheres for use in forming compressible printing blankets having improved compressibility and resiliency. The present invention also provides a method of making a laminated printing blanket by forming a base ply and a surface layer; and disposing therebetween an intermediate compressible layer which is formed by incorporating high melting thermoplastic microspheres in an thereupon having a desired thickness. A reinforcing fabric layer may thereafter be applied to the surface of the compressible layer, whereupon this assembly is vulcanized at conventional temperatures and times to partially cure the compressible layer, thus substantially fixing the position of the high melting thermoplastic microspheres within the matrix.

The compressible layer assembly may thereafter be laminated, at its lower surface, to at least one additional fabric substrate ply and, at its upper surface, to an elastomeric printing or "working" surface. Furthermore, additional fabric or elastomer plys, useful for specific applications, may be incorporated within the blanket, above or below the elastomeric layer, as desired.

A unitary printing blanket is then formed by finally curing the entire blanket assembly under controlled heat and pressure in a well known manner. The final laminated printing blanket comprises at least one base ply, a printing or "working" surface layer and an intermediate compressible layer positioned therebetween. The intermediate layer has a closed cell cellular structure with a substantially uniform thickness and substantially evenly distributed voids of substantially uniform size, in which the voids are not interconnected.

Other details, features, objects, uses, and advantages of this invention will become apparent from the embodiments thereof presented in the following detailed description, drawings and claims.

DESCRIPTION OF THE PREFERRED EMBODIMENTS

Figure 1:
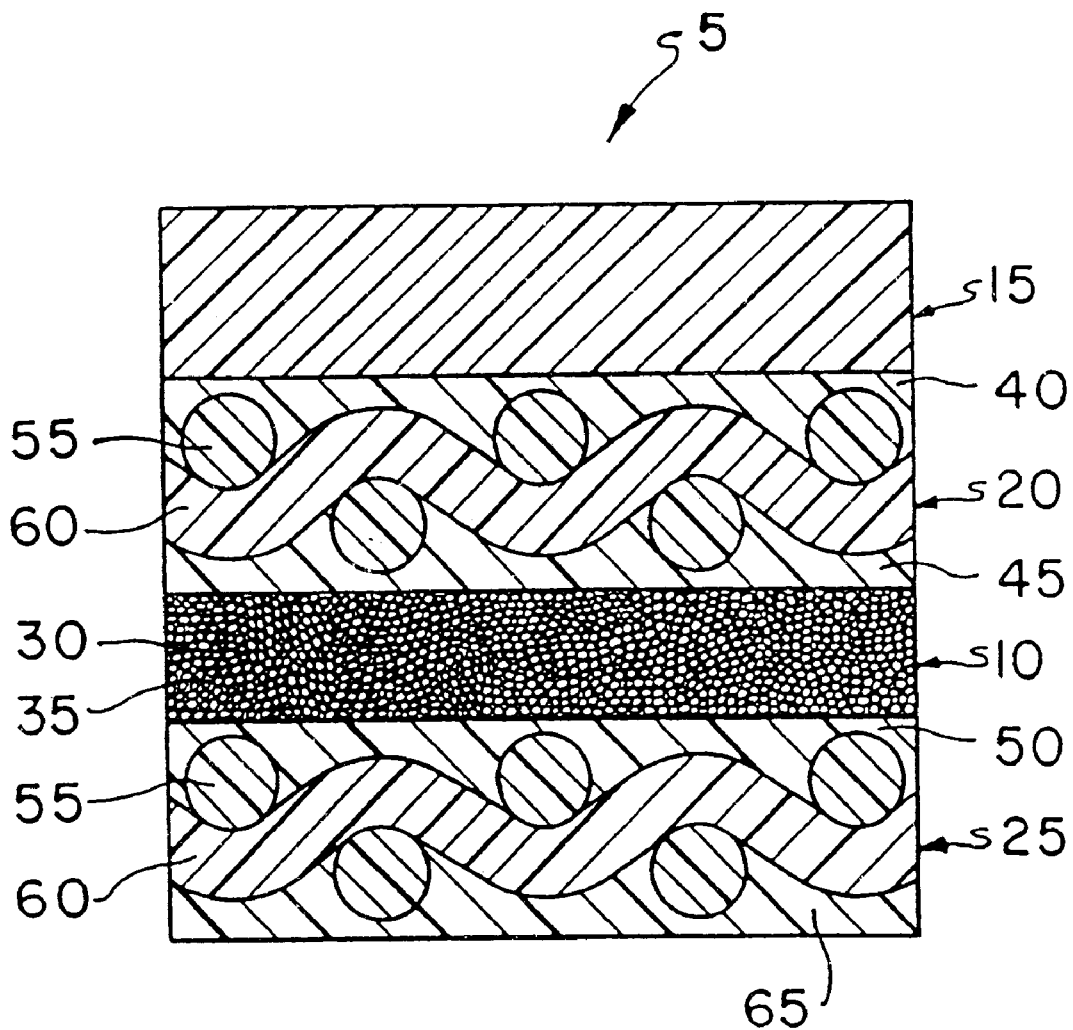
FIG. 1 illustrates a cross section of a typical printing blanket which includes a compressible layer formed according to the present invention.

Reference is now made to FIG. 1 which illustrates a typical printing blanket 5 which includes a compressible layer 10 formed according to the present invention. The laminated printing blanket 5 includes, from top to bottom, at least a working surface layer 15, a reinforcing fabric layer 20, the compressible layer 10, and at least one fabric substrate ply 25. Those skilled in the art will recognize that the number and types of layers used, particularly the number of fabric plys positioned above and below the compressible layer, can vary depending on the uses to which the blanket is to be put.

Voids 30 in compressible layer 10, formed as described below, make it possible to displace the surface layer 15 of the blanket without distortion under operating conditions. As illustrated in FIG. 1, voids 30 have a substantially uniform size and distribution and are not interconnected. It has been found that the dimensions of the voids 30 produced in the compressible layer 10 are generally in the same range as the dimensions of the microspheres used to create the voids.

Compressible layer 10 is formed of an elastomeric compound 35 having the usual processing, stabilizing, strengthening and curing additives, which need not be described herein as they are all well known in the art, and is formulated with reference to its specific application. Moreover, as is also known in the art, this formulation is different than the one used for the printing surface since the two layers require different attributes. Any suitable polymeric material, such as a rubber or rubber blend compound, which is considered a curable or vulcanizable material can be used to form the compressible layer; for example, natural rubber, styrene-butadiene rubber (SBR), EPDM (ethylene/-propylene/non-conjugated diene ter-polymer rubber), butyl rubber, butadiene, acrylonitrile rubber (NBR), polyurethanes etc. An elastomer which is resistant to solvents and inks is most preferable, such as 100% nitrile. Alternately, a blend of nitrile and neoprene such as 40/60 nitrile: neoprene may also be used.

The fabric layers 20, 25, comprised of warp fibers 55 and fill fibers 60, should be made of plain woven fabric of lower extensibility in the warp direction, i.e., the direction longitudinal to the machining of the blanket, and are typically high grade cotton yarns, which are free from slubs and knots, weaving defects, seeds, etc. The fabric may also be a synthetic material such as rayon, nylon, polyester or mixtures thereof. Typically, a fabric layer will be about 0.003 to 0.016 in. thick. Fabrics suitable for use in forming printing blankets comprising the compressible layer of the present invention (in addition to those set forth in the Example provided below) include but are not limited to those disclosed in Larson et al. U.S. Pat. No. 4,042,743, the disclosure of which is incorporated herein by specific reference hereto.

Lowermost fabric ply 25, and optionally, the other fabric ply(s) such as, e.g., fabric ply 20, is thoroughly saturated with a coating material 65 to render the fabric ink, water and solvent repellant. Coating material 65 is preferably a fluorocarbon having either a solvent or a water base and is of such low viscosity, i.e., essentially the same as water, that complete penetration of the fabric ply(s) so treated is possible. This coating treatment effectively eliminates the possibility of wicking through interior channels within the fabric. Thus it is no longer necessary, as practiced in the prior art, to seal the cut edges of the blanket. Alternately, numerous other treating materials, such as silicone compounds having similar water and solvent-resistant properties, may be utilized in place of the fluorocarbon material.

In place of the fabrics described above for use in forming the fabric plys for inclusion within a printing blanket comprising the compressible layer of the present invention, one could substitute a variety of alternate fabrics, both natural and synthetic, including those having a fiber count different from that disclosed in the Example set forth below, as long as these materials possess the requisite degree of stretch and tensile strength. Still further, materials such as porous plastic, paper, or rubber sheets having the appropriate characteristics may also be substituted for the above discussed fabrics.

The compressible layer 10 is formed by dispersing within the elastomeric compound 35 described above a plurality of high melting point thermoplastic microspheres and applying the resultant mixture to an upper surface of a fabric substrate ply, preferably by spread coating. In the preferred technique, the elastomeric compound is first brought to the desired consistency for spreading by adding a solvent. Then, a number of layers of the compound are spread onto the fabric to make a compressible layer 10 of the desired thickness. As each layer is applied, it is solidified, but not crosslinked. Compressible layer 10 may have a thickness of between about 0.004 to 0.030 inches, although it is preferred that the layer be about 0.011 to 0.012 inches thick. Alternately, calendaring, extruding, dipping or any other known means for contacting the fabric with the elastomeric matrix containing the microspheres may be used if desired in place of the spread coating technique.

The microspheres for use with the present invention are formed, as noted above, from a thermoplastic resin. One requirement, however, is that the specific thermoplastic resin(s) must be and remain stable at "high" temperatures, i.e., above about 135° C. (275° F.), to enable processing at typical blanket curing temperatures without melting, deforming or otherwise degrading. The terms "high melting" and "high melting point" are utilized throughout this specification to refer to such materials.

As noted above, the prior art teaches that low melting thermoplastic microspheres are resilient but possess a processing disadvantage in that special procedures, (e.g., an extended vulcanization time) are needed to properly set the microspheres within the matrix prior to vulcanization. In addition, the prior art also teaches that thermosetting microspheres can be used without concern as to the vulcanization step, but that these microspheres are not as resilient as the thermoplastic microspheres. The present invention provides a substantial improvement over these prior art compressible layers because the high melting thermoplastic microspheres have better resiliency than the thermosetting microspheres, and also permit the use of short, high temperature vulcanization procedures without concern as to degradation of the microspheres.

High melting point thermoplastic resins which are acceptable for use with the present invention include, but are not limited to, vinylidine halide homopolymers and copolymers, particularly those of vinylidine chloride with vinyl chloride, acrylates or nitriles; fluoroplastics such as PTFE (polytetrafluoroethylene), FEP (fluorinated ethylene propylene) copolymers, perfluoroalkoxy (PFA) resin, PCTFE (polychlorotrifluoroethylene), ECTFE (ethylene-chlorotrifluoroethylene) copolymer, ETFE (ethylene-tetrafluoroethylene) copolymers, PVDF (polyvinylidine fluoride), PVF (polyvinyl fluoride); PAEKs, i.e., polyaryletherketones; nitrile resins; nylon or polyamide resins; polyamide-imides; polyarylates; polybenzimidazoles; polycarbonates; thermoplastic polyesters such as PBT (polybutylene terephthalate), PCT (polycyclohexylene dimethylene terephthalate) and PET (polyethylene terephthalate); the polyetherimides; PMP (polymethylpentene); modified PPO (polyphenylene oxide); PPS (polyphenylene sulfide); polypropylene; chlorinated PVC (polyvinyl chloride); and mixtures thereof.

A variety of acceptable types of thermoplastic microspheres for use with the present invention are currently available on the market. Preferred microspheres are marketed by Expancel of Sundsvall, Sweden under the trade names Expancel 091 DE and Expancel 091 DU, with "DE" standing for "dry, expanded" and "DU" standing for "dry, unexpanded". This microsphere comprises a copolymer of acrylonitrile, methacrylonitrile ane methyl methacrylate and pentane as the solvent.

The preferred diameter range for the high melting thermoplastic microspheres used in the invention is typically between about 1–200 $\mu$, and more preferably between about 50 and 130 $\mu$, with an average size of about 90 $\mu$ being especially preferred. Generally, the microspheres are uniformly distributed throughout the elastomer by mixing in such a manner as to avoid any appreciable crushing thereof. The microspheres are dispersed within the elastomeric matrix at a loading of between about 1–90%, and preferably 2–70% of the solid contents. This percentage will of course vary based on such factors as microsphere dimension, wall thickness and bulk density. The amount and the size of the specific microspheres used is based on the desired compressibility of the blanket. If desired, the microspheres may further include a coating thereupon to facilitate their bonding with the matrix material. Materials for use in forming such coatings include talc, calcium carbonate, zinc oxide, titanium dioxide, mica, calcium sulfate, barium sulfate, antimony oxide, clay, silica and aluminum trihydrate.

In a preferred embodiment of the invention, therefore, voids 30 of compressible layer 10 are formed with high melting thermoplastic microspheres having a melting point above about 135° C. (275° F.). These microspheres have been found to provide a significantly improved performance during curing, i.e., by permitting the use of substantially higher temperatures for substantially shorter terms than was previously possible with the lower melting microspheres used in prior art blankets and by avoiding the use of accelerating agents. The present invention significantly reduces the curing time for the compressible layer from about 10–12 hours to about four hours, thus reducing both the complexity and the cost of the curing process and therefore the operation as a whole. The vulcanizing process used to cure compressible layer 10 is described below.

Preferably, the presence of water is avoided during the incorporation of the microspheres in the elastomer in order to avoid water vapor blowing during any subsequent heating of the polymer. For this reason, the microspheres are preferably dried before mixing with the elastomer.

The printing surface layer 15 is formed by the spread coating procedure described above, however, using an elastomeric compound suitable for the working face of the printing blanket. One example of such a compound is a nitrile/polysulfide blend. A number of layers of the elastomeric compound are typically required to make a printing surface layer of the desired thickness. In general, the surface layer will be about 0.005 to 0.025 inches thick, preferably about 0.010 to 0.015 inches in thickness. It is most preferred to provide a surface layer in the range of about 0.012 to 0.015 in. thick.

It is preferred to use adhesive layers 40, 45, 50 to ensure bonding between the different plys in blanket 5.

The adhesive layers for bonding the various fabric and elastomeric plys together may be any compatible elastomer, as is known in the art. Preferably, as the adhesive one can utilize the same elastomer that is used for the matrix of the compressible layer. When applying the adhesive to any of the fabric layers, it is usually spread with a knife-over-roll-spreader, although this method may be replaced by any alternate technique which produces the same result. The adhesive is applied in layers until the desired thickness is obtained.

The steps of preparing a printing blanket incorporating the compressible layer of the invention are set forth below. In a typical printing blanket, i.e., "typical" in that it normally contains, at a minimum as described above, at least a fabric substrate 25, a working surface 15, a reinforcing fabric layer 20 and a compressible layer 10 positioned between the fabric layer and fabric substrate 25, adhesive layers 40, 45, 50, preferably of a compounded nitrile rubber but which may instead be chosen from a variety of water and solvent based adhesives, are used to join the layers together. Adhesive layer 50 is spread on the upper surface of a first fabric substrate 25. Compressible layer 10 is then formed by mixing high melting thermoplastic microspheres with an elastomeric matrix in a ratio of about 1–90% by weight of the elastomeric material and preferably 2–70% by weight for about 30 minutes to form an elastomeric compound; after which the compound is spread onto the adhesive layer 50.

In general, a number of layers of the compound are required to obtain the desired thickness of the compressible layer, i.e., between about 0.008 and 0.015 inches. Individual layers having a thickness of about 0.002 inches are a suitable thickness for this application. Still further, the bonding between the fabric substrate ply 25 and the compressible layer 10 may alternately or additionally be effected by a chemical reaction occurring between the two layers triggered during a subsequent curing process as described herein.

The compressible layer is then cured. This layer may be festooned within an oven whereupon it is subjected to elevated temperatures of at least about 80° C. to vulcanize the elastomeric compound to a degree sufficient to set the structure of the polymeric matrix with the microspheres fixed in position therein. Alternately, instead of festooning, the compressible layer may instead be cured by the well known drum wrapping technique or by a continuous curing process such as rotocuring or curing using a double belt press.

Vulcanization of the compressible layer on the fabric substrate is performed at a temperature of between about 80–150° C. for a time of between about 1 and 6 hours with lower temperatures requiring longer times. Typically, about 3½–4½ hours at 125–135° C. is sufficient. If desired, the compressible layer may be conditioned, i.e., preheated, in one or more stages at temperatures lower than the vulcanizing temperature prior to commencing the actual vulcanization treatment. This helps to ensure that the entire mass of the compressible layer is uniformly warmed prior to heating at the actual vulcanizing temperature (i.e., about 135° C.) at which the positions of the microspheres becomes substantially fixed within the matrix.

In the preferred embodiment of the invention, substantially all the sites in the elastomeric polymer which forms the compressible layer are substantially completely crosslinked in this vulcanization step (the blanket as a whole undergoes a further vulcanization treatment step, as described below) to provide the preferred elastic modulus and resiliency and other elastic properties of the elastomer. Of course, those skilled in the art will recognize that, in a rubber product, cross-linking is a continuing process, and that no rubber material is ever completely crosslinked. Therefore, those skilled in the art will recognize that the vulcanization process during the cure of compressible layer 10 may be interrupted prior to optimum vulcanization as long as the elastomeric matrix containing the microspheres has set up sufficiently to "freeze" the microspheres in position; while still obtaining an acceptable product. A thus "partially" vulcanized compressible layer may obtain better crosslinking with the base layer and the printing surface upon formation of the laminated printing blanket. One skilled in the art will also recognize, however, that a compressible layer which has been substantially completely vulcanized, may be crosslinked to the base ply and the surface layer by means of an adhesive specifically formulated for such a purpose.

After curing the compressible layer 10, a second adhesive layer 45 is then spread on the upper surface of compressible layer 10, and onto one side of a reinforcing fabric layer 20. These layers are then bonded thereto by the second adhesive layer. Next, the reinforcing fabric ply 20 may be laminated to the lower side of the working surface 15 by means, e.g., of an adhesive layer 40. Bonding of the layers is typically carried out using laminating pinch rollers.

The exact construction of the blanket may of course be varied according to its intended use. For example, two fabric substrate plys may be utilized instead of one, or a third or additional similar layers may be incorporated. When two or more such layers are used they are positioned in adjacent face relation to each other, that is, a lower surface of one such ply rests atop the upper surface of the fabric ply located directly below, with the possible, i.e., optional, addition of an adhesive layer therebetween to facilitate bonding between the layers. It may also be desired to provide additional reinforcing fabric plys similar to that which is described above, between the working surface and compressible layer 10. Such an arrangement protects the compressible layer from the higher stresses typically found at the printing surface, thus providing an enhanced degree of smash resistance to the blanket.

The resultant blanket assembly is then finally cured by a vulcanization process well known in the art for this purpose, at a temperature of between about 132° C. to 160° C., and preferably 143° C. to 149° C., for one-half hour to 16 hours under pressures ranging from atmospheric to 6 kg/cm$^2$. These variables will depend on the exact compounding. Moreover, in the blanket vulcanizing step, a relatively smooth paper film having a fine finish may be disposed in contact with the face of the printing blanket, together with a fine talc prior to placing the blanket in the vulcanizing oven. The paper assures the smoothness of the printing blanket since the smoothness of the paper is imparted to the working surface of the printing blanket. For many applications, the finish thus provided to the printing blanket by the paper will be sufficient for its use, and grinding of the surface will not be required. However, if desired, the working surface may be buffed with medium or coarse grit sandpaper to obtain an appropriate surface profile for a particular application. Such surface profiles are typically measured by a device known as a profilometer, which is well known in the art.

As noted above, the curing of the intermediate compressible layer at temperatures above about 80° C. causes the high melting thermoplastic microspheres to be captured in stationary or set positions in the elastomeric matrix. Since the positions of the microspheres are set in the matrix, the positions of the voids created by the microcapsules are thus predetermined by the position of the microcapsules in the matrix. Therefore, when the assembled blanket undergoes the final vulcanization step, the already set structure of the intermediate layer holds its shape and prevents the agglomeration of voids or the collapse of voids in the layer. This fixed position will not change under final processing of the blanket.

EXAMPLE

The following non-limiting Example is provided solely for the purpose of illustration and is not to be construed as limiting the invention in any manner. The Example describes particular steps and materials which may be used in practicing a preferred mode of the invention taught herein.

---

Fabric

---

Yarn Composition:

Warp: 18's/2 ply long staple cotton
Fill: 20's single Polynosic rayon
Yarn Count:

Warp: 22/cm
Fill: 22/cm
Weight:
210 ± 10 g./sq. m.
Gauge:
38/100 mm
Tensile Strength:

Warp: ≧140 kg/5 cm
Fill: ≧55 kg/5 cm
Residual Stretch
≦1.8%

---

Cell Producing Media
  Expancel 091 DE high melting thermoplastic microspheres
Elastomeric Matrix
  100% nitrile rubber.

The process of forming the compressible layer of the invention is described as follows:

(1) The microspheres are thoroughly mixed and dispersed within the elastomeric material used to form the matrix of the compressible layer at a loading of about 3% by weight of the elastomeric compound.

(2) The resultant mixture is then spread in successive passes onto the fabric with a knife-over-roll-spreader until the elastomer reaches the desired gauge.

(3) The spread coated fabric is then festooned in an oven and vulcanized according to the following conditions: fifteen minutes at a temperature ranging between room temperature and ninety-three degrees centigrade; followed by fifteen minutes at a temperature from ninety-three to one hundred twenty seven degrees centigrade; followed by fifteen minutes at a temperature from one hundred twenty seven to one hundred thirty five degrees centigrade; followed by three and a quarter hours at a temperature of one hundred thirty five degrees centigrade.

The compressible ply may thereafter be utilized in forming a printing blanket according to the process as described above.

It is to be noted that the above description is merely illustrative of the invention, and other parameters and embodiments may be used without departing from the inventive concept herein. Accordingly, the present invention is only limited by the appended claims.

We claim:

1. A process for forming a compressible layer by vulcanization which comprises:
    dispersing substantially uniformly throughout an elastomeric matrix a plurality of thermoplastic microspheres that remain stable and have a melting temperature which is higher than that of the vulcanization;
    applying at least one coating of said microsphere containing elastomeric matrix at a substantially uniform thickness to a surface of a base fabric ply to form a coated base fabric ply; and
    vulcanizing said coated base fabric ply at a temperature of about 80–150° C. for a time sufficient to substantially fix the position of said thermoplastic microspheres within said matrix and form a compressible layer such that said microspheres provide substantially uniform compression characteristics to said layer.

2. The process of claim 1 wherein the vulcanizing step is conducted at a temperature of about 125–135° C. for about 3½ to 4½ hours.

3. The process of claim 2 wherein the thermoplastic microspheres have a melting temperature above about 135° C. and which further comprises selecting said microspheres from a thermoplastic resin selected from the group consisting of vinylidene halide homopolymers and copolymers, fluoroplastics, polyaryletherketones, polyamide-imides, polyarylates, polybenzimidazoles, polycarbonates, thermoplastic polyesters, polyetherimides, polyamides, polymethylpentene, modified polyphenylene oxide, polyphenylene sulfide, polypropylene, chlorinated polyvinyl chloride, and mixtures thereof.

4. The process of claim 1 which further comprises bonding a reinforcing fabric ply to substantially an entire surface of said microsphere containing matrix to form an intermediate compressible layer assembly.

5. The process of claim 1 which further comprises at least one preheating or conditioning stage which is conducted at a temperature lower than about 135° C. prior to the vulcanizing step.

6. A process for making a compressible printing blanket by vulcanization and curing which comprises:
    dispersing substantially uniformly throughout an elastomeric matrix a plurality of thermoplastic microspheres having a diameter of between about 1–200 μm that remain stable and have a melting temperature which is above about 135° C.;
    applying at least one coating of said microspheres containing elastomeric matrix at a substantially uniform thickness to a surface of a first base fabric ply to form a coated base fabric ply;
    vulcanizing said coated base fabric ply at a temperature of about 80–150° C. for a time sufficient to substantially fix the position of said microspheres within said matrix to form a compressible layer, such that said microspheres provide substantially uniform compression characteristics to said layer;

bonding a reinforcing fabric ply to a surface of said vulcanized coated base fabric ply to form a reinforced compressible layer assembly;

applying an elastomeric working surface to an upper surface of said reinforcing fabric ply to form a blanket assembly; and curing said blanket assembly at a temperature of about 132–160° C. for a time sufficient to bond said reinforced compressible layer assembly to said reinforcing fabric ply and said working surface to thereby form a laminated printing blanket.

7. The process of claim 6 which further comprises bonding a second base fabric ply to a surface of said first base ply.

8. The process of claim 6 which further comprises interposing an additional reinforcing fabric ply between said compressible layer assembly and said working surface to protect the compressible layer from stresses occurring at an upper surface of said working surface.

9. The process of claim 6 which further comprises applying an adhesive layer between each adjacent ply of said blanket prior to curing said blanket assembly to form a bond between said adjacent plies.

10. The process of claim 6 wherein said microsphere containing matrix is applied by spread coating upon said base fabric ply to obtain a coating thereupon having a thickness of between about 0.004 and 0.030 inches.

11. The process of claim 6 which further comprises dispersing said microspheres within said matrix at a loading of between about 1–90% by weight of said matrix.

12. The process of claim 6 wherein the thermoplastic microspheres have a melting temperature above about 135° C. and which further comprises selecting said microspheres from a thermoplastic resin selected from the group consisting of vinylidene halide homopolymers and copolymers, fluoroplastics, polyaryletheketones, polyamide-imides, polyarylates, polybenzimidazoles, polycarbonates, thermoplastic polyesters, polyetherimides, polyamides, polymethylpentene, modified polyphenylene oxide, polyphenylene sulfide, polypropylene, chlorinated polyvinyl chloride, and mixtures thereof.

13. The process of claim 6 which further comprises at least one preheating or conditioning stage which is conducted at a temperature lower than about 135° C.

14. A process for forming a compressible layer by vulcanization which comprises:

dispersing substantially uniformly throughout an elastomeric matrix a plurality of thermoplastic microspheres that remain stable and have a melting temperature which is above about 135° C.;

applying at least one coating of said microsphere containing elastomeric matrix at a substantially uniform thickness to a surface of a base fabric ply to form a coated base fabric ply; and vulcanizing said coated base fabric ply at a temperature of about 80–150° C. for a time sufficient to substantially fix the position of said thermoplastic microspheres within said matrix and form a compressible layer such that said microspheres provide substantially uniform compression characteristics to said layer, wherein the melting temperature of the microsphere is greater than the vulcanization temperature.

15. The process of claim 14 which further comprises selecting said microspheres from a thermoplastic resin selected from the group consisting of vinylidene halide homopolymers and copolymers, fluoroplastics, polyaryletherketones, polyamide-imides, polyarylates, polybenzimidazoles, polycarbonates, thermoplastic polyesters, polyetherimides, polyamides, polymethylpentene, modified polyphenylene oxide, polyphenylene sulfide, polypropylene, chlorinated polyvinyl chloride, and mixtures thereof.

16. The process of claim 14 which further comprises at least one preheating or conditioning stage which is conducted at a temperature lower than about 135° C. prior to the vulcanizing step.

17. The process of claim 14 which further comprises:

bonding a reinforcing fabric ply to a surface of said vulcanized coated base fabric ply to form a reinforced compressible layer assembly;

applying an elastomeric working surface to an upper surface of said reinforcing fabric ply to form a blanket assembly; and curing said blanket assembly at a temperature of about 132–160° C. for a time sufficient to bond said reinforced compressible layer assembly to said reinforcing fabric ply and said working surface to thereby form a laminated compressible printing blanket.

18. The process of claim 17 which further comprises interposing an additional reinforcing fabric ply between said compressible layer assembly and said working surface to protect the compressible layer from stresses occurring at an upper surface of said working surface.

19. The process of claim 17 wherein said microsphere-containing matrix is applied by spread coating upon said base fabric ply to obtain a coating thereupon having a thickness of between about 0.004 and 0.030 inches.

20. The process of claim 17 which further comprises dispersing said microspheres within said matrix at a loading of between about 1–90% by weight of said matrix.

* * * * *